(12) United States Patent
Hüger et al.

(10) Patent No.: US 10,882,555 B2
(45) Date of Patent: Jan. 5, 2021

(54) METHOD FOR OPERATING AN OPERATING DEVICE FOR A TRANSPORTATION VEHICLE TO ASSIST A DRIVER WHEN COUPLING THE TRANSPORTATION VEHICLE TO A TRAILER, OPERATING DEVICE, AND TRANSPORTATION VEHICLE

(71) Applicant: VOLKSWAGEN AKTIENGESELLSCHAFT, Wolfsburg (DE)

(72) Inventors: Philipp Hüger, Rühen (DE); Sascha Ziebart, Calberlah (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 182 days.

(21) Appl. No.: 16/202,885

(22) Filed: Nov. 28, 2018

(65) Prior Publication Data
US 2019/0161120 A1     May 30, 2019

(30) Foreign Application Priority Data
Nov. 29, 2017    (DE) ........................ 10 2017 221 458

(51) Int. Cl.
*B62D 15/02*        (2006.01)
*B60K 35/00*        (2006.01)
(Continued)

(52) U.S. Cl.
CPC ............. *B62D 15/029* (2013.01); *B60D 1/36* (2013.01); *B60D 1/363* (2013.01); *B60D 1/62* (2013.01);
(Continued)

(58) Field of Classification Search
CPC ...... B62D 15/029; G01C 11/00; B60W 50/14; B60W 40/02; B60W 30/06; B60R 1/00;
(Continued)

(56) References Cited

U.S. PATENT DOCUMENTS

2002/0149673 A1    10/2002    Hirama et al.
2018/0001721 A1*    1/2018    Huger .................. G06T 7/70

FOREIGN PATENT DOCUMENTS

DE          60219904 T2    1/2008
DE    102007039687 A1    3/2009
(Continued)

*Primary Examiner* — Yuen Wong
(74) *Attorney, Agent, or Firm* — Barnes & Thornburg LLP (57) ABSTRACT

A method for operating a control device for a transportation vehicle to assist a driver maneuvering the transportation vehicle up to a trailer to couple the transportation vehicle to the trailer, wherein target coordinates of a coupling position provided for the transportation vehicle for coupling are determined by the control device and the process repeated, while a graphical distance display element is displayed to the driver by a display apparatus, a current distance value of a distance of the transportation vehicle from the coupling position is determined, and a size parameter of the graphical distance display element is adjusted based on the current distance value. A non-linear scaling function brings about a higher position resolution in a near region around the coupling position than outside the near region is used for a conversion from the respectively current distance value into a value of the size parameter.

13 Claims, 8 Drawing Sheets

(51) Int. Cl.
  *B60D 1/36*   (2006.01)
  *B60D 1/62*   (2006.01)
  *B60W 30/06*  (2006.01)
  *B60W 40/02*  (2006.01)
  *B60R 1/00*   (2006.01)
  *B60W 50/14*  (2020.01)
  *G01C 11/00*  (2006.01)

(52) U.S. Cl.
  CPC ............... *B60K 35/00* (2013.01); *B60R 1/00* (2013.01); *B60W 30/06* (2013.01); *B60W 40/02* (2013.01); *B60W 50/14* (2013.01); *G01C 11/00* (2013.01); *B60K 2370/152* (2019.05); *B60K 2370/173* (2019.05); *B60K 2370/176* (2019.05); *B60K 2370/179* (2019.05); *B60K 2370/186* (2019.05); *B60R 2300/305* (2013.01); *B60R 2300/808* (2013.01)

(58) Field of Classification Search
  CPC ........ B60R 2300/808; B60R 2300/305; B60D 1/62; B60D 1/36; B60D 1/363; B60K 35/00; B60K 2370/176; B60K 2370/179; B60K 2370/186; B60K 2370/173; B60K 2370/152
  See application file for complete search history.

(56) References Cited

FOREIGN PATENT DOCUMENTS

| | | |
|---|---|---|
| DE | 102009045284 A1 | 4/2011 |
| DE | 112014004554 T5 | 7/2016 |
| EP | 2987663 A1 | 2/2016 |
| GB | 2447672 A | 9/2008 |

\* cited by examiner

METHOD FOR OPERATING AN OPERATING DEVICE FOR A TRANSPORTATION VEHICLE TO ASSIST A DRIVER WHEN COUPLING THE TRANSPORTATION VEHICLE TO A TRAILER, OPERATING DEVICE, AND TRANSPORTATION VEHICLE

PRIORITY CLAIM

This patent application claims priority to German Patent Application No. 10 2017 221 458.9, filed 29 Nov. 2017, the disclosure of which is incorporated herein by reference in its entirety.

SUMMARY

Illustrative embodiments relate to a method for operating a control device for a transportation vehicle to assist a driver maneuvering the transportation vehicle up to a trailer to couple the transportation vehicle to the trailer. Illustrative embodiments also relate to a control device that can be operated according to the disclosed method. The control device can, for example, be an infotainment system (information/entertainment system) or a smartphone. Illustrative embodiments also relate to a transportation vehicle with the disclosed control device.

BRIEF DESCRIPTION OF THE DRAWINGS

An exemplary embodiment is described below with reference to the drawings, in which.

DETAILED DESCRIPTION

A transportation vehicle can comprise a trailer coupling to which a trailer can be coupled, so that a pairing of transportation vehicle and trailer results. The transportation vehicle can then tow the trailer. To couple to such a trailer, it is necessary to approach the towbar of the trailer with the transportation vehicle accurately. While it is adequate in the case of lightweight trailers for the transportation vehicle to stop close to the towbar, since one can then push or pull the trailer the last short distance up to the transportation vehicle until the trailer hitch of the towbar is positioned above the ball head of the trailer coupling, and the trailer can thus be coupled to the transportation vehicle, this is not possible in the case of heavy trailers. With heavy trailers, the transportation vehicle must be maneuvered precisely up to a coupling position and stopped there. The coupling position results when the trailer hitch of the towbar is positioned vertically above the ball head of the trailer coupling, so that the towbar only has to be lowered for the trailer to be coupled to the transportation vehicle. A user is thereby saved from pushing, turning or rolling the trailer.

For a driver of a transportation vehicle to be able to maneuver it into the coupling position, he must estimate when the trailer coupling is located underneath the ball head of the towbar. He can, for example, use a reversing camera which films the surrounding of the transportation vehicle in the region of the rear and displays at least one camera image to the driver on a display apparatus for this purpose. The problem of recognizing when the coupling position has been reached nevertheless remains significant. The reason for this is that the distance of the towbar appears differently in the camera image, depending on the adjusted height of the towbar, which can be varied with a crank handle. If the towbar is set high, it looks as if it is necessary to drive further, while with a low-set towbar, a relative position to the trailer coupling can be estimated more easily.

The provision of a dedicated video camera at a transportation vehicle specifically for assisting maneuvering the transportation vehicle when coupling to a trailer is known for this purpose from EP 2 987 663 A1, wherein the optical axis of the camera is horizontal and aligned in the direction of the longitudinal axis of the transportation vehicle. With this constellation, however, the distance of the trailer in the camera image is difficult to estimate, since an immediate plan view of the trailer towbar results. With the open-end coupling described in the document, this is compensated for in that the transportation vehicle can be driven up to the stop underneath the trailer, so that the coupling bolt latches into the jaw of the open-end coupling.

For coupling a transportation vehicle to a trailer that does not autonomously latch into an open-end coupling, the overlay in the camera image of auxiliary lines that provide a visual display of the distance of the transportation vehicle from a trailer coupling visible in the camera image of a reversing camera is known from DE 602 19 904 T2. These auxiliary lines, however, only have a coarse raster for maneuvering the transportation vehicle to the final centimeters (for example, in a range closer than 0.5 meters from the described coupling position). According to the prior art, the raster of the auxiliary lines is changed, depending on the distance from the trailer, to compensate for this. A zoom factor of the camera can, in addition, be magnified if the trailer is located closer than one meter from the transportation vehicle. A driver himself must then perform the distance estimation of the distance of the transportation vehicle from the towbar of the trailer on the basis of the magnified camera image. An artificially calculated plan view of the trailer coupling and of the towbar is displayed for this purpose.

Because it is not possible, with an artificially calculated plan view, to recognize the height difference between the towbar and the trailer coupling, it is provided in a system for coupling a trailer to a transportation vehicle according to DE 11 2014 004 554 T5 that, in addition to the artificially generated plan view, a height estimation is made available that determines the relative height between the trailer coupling of the transportation vehicle and the trailer coupler of the trailer, and gives an alarm if the relative height is less than a predetermined threshold value.

While the maneuvering is thus assisted according to the prior art by zooming a camera image and by an artificially calculated plan view, the driver must always still himself estimate how far and how quickly he should approach the final coupling position with the transportation vehicle. He must also rely on the fact that the artificially calculated plan view correctly displays the distance relationships.

Disclosed embodiments assist a driver of a transportation vehicle while the driver maneuvers the transportation vehicle up to a trailer to be able to couple the trailer to the transportation vehicle.

A method for operating a control device for a transportation vehicle is provided. By the method, a driver is assisted in maneuvering the transportation vehicle up to a trailer to couple to it. Target coordinates of a coupling position that is provided for the transportation vehicle for coupling are determined for this purpose by the control device. The condition can be satisfied in the coupling position in the manner that the trailer can be joined immediately with the trailer coupling simply by lowering the towbar of the trailer. In other words, in the coupling position it is no longer necessary to shift the trailer to complete the coupling. So that the driver knows how far the transportation vehicle still is from the coupling position, the driver receives a display of a graphical distance element. Such a distance element can, for example, be the "distance bar", i.e., a bargraph, known per se. While the graphical distance element is displayed to the driver by a display apparatus, a current distance value of the distance of the transportation vehicle from the coupling position is determined repeatedly, and a predetermined size parameter of the graphical distance display element is set, depending on the current distance value. In the case of a distance bar, it is thus, for example, possible for the length to be set depending on the distance value as the size parameter. The distance bar can thus become shorter as the distance of the transportation vehicle from the coupling position reduces. The control device thus knows the target coordinates of the coupling position, and informs the driver by the distance display element of how far distant the transportation vehicle still is from the coupling position. The driver can then approach the coupling position by longitudinal control (accelerating and braking) of the transportation vehicle. The transverse control (steering) can be performed or carried out by the driver himself or by a driver assistance system.

The driver must now be able to position the transportation vehicle very precisely to the final centimeters, so that the trailer coupling comes to a halt, or is positioned, under the towbar with a precision of the order of a centimeter. On the other hand, it must also be possible for the distance to be displayed when the transportation vehicle is still located at a distance of more than 50 cm, or more than 1 m distance. So if the full length or, in general, the full value of the size parameter represents the maximum displayable distance (e.g., 5 m), then, when maneuvering over the final centimeters (distance less than 50 cm, or distance less than 30 cm), the distance display element is shown relatively small, so that a distance change in a near region of less than 10 cm is hard for the driver to recognize on the display apparatus. If a distance bar is, for example, 5 cm long, and if this should correspond to a distance A of 5 m, then, in the case of a linear scaling function (5 m→5 cm), a bar length of 0.5 mm would result from the remaining distance A of 5 cm. A roll path of 10 cm could no longer be displayed perceptibly.

To avoid this, it is provided that a linear scaling function that converts the distance value into a value of the size parameter, for example, a length of the graphical distance element, is not simply used for a conversion from the current distance value determined at the time to the value of the size parameter that is to be set. Rather, a non-linear scaling function which, for example, applies a larger scaling or position resolution (e.g., 5 cm→1 cm) in the surrounding region closer than 50 centimeters than outside the surrounding region (e.g., 5 m→5 cm) for the conversion from the current distance value determined at the time to the value of the size parameter to be set. A different change in the value of the size parameter thus results through the non-linear scaling function for the same roll path of transportation vehicle, for example, a roll path of 10 centimeters, depending on whether the transportation vehicle is located outside the near region or inside the near region. The graphical distance element is "more sensitive" within the near region, meaning that a larger change in the value of the size parameter occurs when covering a particular roll path (e.g., 10 cm) than is the case with a transportation vehicle position outside the near region.

In the disclosed embodiments, the remaining distance of the transportation vehicle from the coupling position is displayed to a driver in the transportation vehicle with a distance-adaptive position resolution, or a distance-adaptive sensitivity. It is thus possible by the graphical distance element both for a distance value greater than, for example, 50 centimeters or greater than 1 meter, to be indicated, while nevertheless in the near region, when it is necessary for the transportation vehicle to be maneuvered or positioned with a precision of less than 10 centimeters, in particular, of less than 5 centimeters, a distance change can nevertheless be displayed with a magnified position resolution by the graphical display element. For the special case in which the scaling function has two stages, the boundary of the near region would be in the transition region between the two stages. The radius of the near region can, in general, be in a range from 20 centimeters up to 2 meters.

According to at least one disclosed embodiment, a quotient or a ratio of a change of the size parameter to a predetermined change of the distance provides the basis for the conversion of the current distance value into the value of the size parameter of the graphical display element as the position resolution. Thus, for example, with a predetermined change of 10 centimeters in the distance value, a change of the size parameter of the distance element of a predetermined number of pixels on the display apparatus can be provided, wherein the number of pixels by which the size parameter is changed is greater in the near region than it is outside the near region. Another description for the position resolution of the non-linear scaling function can be a local gradient of the scaling function, which means the gradient of the scaling function at the point of the respective distance value. The local gradient is larger inside the near region than outside the near region.

At least one disclosed embodiment provides that a continuously differentiable curve is provided as the scaling function. In other words, the position resolution changes continuously with the change in the distance to the coupling position. Through this, the driver is presented with a continuous transition to the larger or enlarged position resolution, so that there is no sudden change. The near region referred to does not here have a sharp boundary; rather does a gradual transition result. It is, however, ensured that a near region can be defined that satisfies the conditions described. As an alternative to this, it can be provided that a two-stage or multi-stage switchover function is provided as the scaling function. In other words, the position resolution changes suddenly whenever the transportation vehicle reaches a predetermined distance threshold or stage of the scaling function with respect to the coupling position. The benefit thus arises that the position resolution between these stages remains constant, i.e., the scaling function demonstrates a linear behavior, and the driver can then be informed about the change in the scaling or the position resolution on changing between two stages of the switchover function. A distance-related hysteresis may be provided to the scaling function at the switchover between the stages. This stops the distance display element from flickering.

At least one disclosed embodiment provides that a bar graph, which means a distance bar, or an arrow, is displayed as the graphical distance display element. In this case, a respective length of the bar graph or of the arrow is set as the size parameter. The bar graph or the arrow thus, for example, becomes shorter the closer the transportation vehicle is located to the coupling position. If, however, a two-stage or multi-stage switchover function is provided here as the non-linear scaling function, then it can be provided that the length is suddenly increased again on reaching the respective distance threshold or stage. Depending on the current position resolution, as is defined or predetermined by the non-linear scaling function depending on the distance, the length for each distance covered changes differently when the transportation vehicle moves.

At least one disclosed embodiment provides that the graphical distance display element is displayed while the driver carries out at least a longitudinal control of the transportation vehicle. During the longitudinal control, the display element thus gives the driver an orientation as to whether the driver should continue driving and should accelerate or brake. As already explained, the driver can optionally also carry out a transverse control (steering), which can, however, also be performed by a control device of a driver assistance system.

At least one disclosed embodiment provides that an absolute driving speed or a relative driving speed with respect to the coupling position is determined by the control device. How quickly the transportation vehicle is approaching the coupling position is thus also determined. A check is then made as to whether the respective driving speed is larger than a predetermined threshold value, whereby a test result in relation to the driving speed and the threshold value results. Depending on this test result, a further output parameter, different from the size parameter, of the graphical distance display element and/or a further graphical element displayed on the display apparatus (a warning lamp, for example), and/or an acoustic output, for example, a signal tone, is set by the control device. Thus if the driving speed is greater than the threshold value, a different value of the output parameter results from the case in which the driving speed is smaller than the threshold value. The output parameter can, for example, be the color of the distance display element or of the other graphical element. In terms of the acoustic output, the output parameter can, for example, be an interval duration or pulse duration of a pulsed tone and/or a tone pitch and/or any tone activity (on/off). The driver thus learns in a beneficial manner whether he is approaching the coupling position too fast (greater than the threshold value).

At least one disclosed embodiment provides that the threshold value is set depending on the determined distance value. The definition of "too fast" depends, in other words, on the distance of the transportation vehicle from the coupling position. A swift approach without warning can be achieved in a beneficial manner in this way and nevertheless, particularly in the near region, be based on a lower threshold value.

At least one disclosed embodiment provides that, depending on the respective driving speed determined and on the distance value determined, a check is made as to whether the respective driving speed will prospectively be larger than the threshold value within a predetermined period of time in the future. This can, for example, make sense if the threshold value is set depending on the distance value, and thus, even when the speed remains constant, the threshold value becomes smaller on approach to the coupling position and thus falls below the driving speed as from a specific distance value. This time point can be determined on the assumption of a driving speed that is constant or which remains constant in the future. A further test result thus arises, indicating whether the driving speed will prospectively be greater than the threshold value within a predetermined period of time. This further test result is used to set the further output parameter. The driver is thus informed that the driving speed will "soon be too high". The beneficial results from this that a reaction time of the driver can be taken into account. The period of time can, for example, lie in a range between 0.5 seconds up to 10 seconds.

At least one disclosed embodiment provides that a relative position of the transportation vehicle from the trailer, at which a coupling socket or ball or, in general, a coupling mechanism of a trailer towbar of the trailer is arranged vertically above the trailer coupling of the transportation vehicle, in particular, vertically over a ball head of the trailer coupling, is specified as the coupling position. The coupling can thus simply be completed in the manner in a beneficial manner in that the trailer towbar is lowered, without the trailer having to be rolled or rotated about its vertical access in the process.

At least one disclosed embodiment provides that the target coordinates of the trailer coupling are determined by an image processing system which receives, once or repeatedly, at least one camera image from at least one camera, for example, a reversing camera, and recognizes a predetermined component of the trailer in at least one camera image, for example, its trailer towbar or the coupling socket or the coupling mechanism of the trailer towbar. A position of the transportation vehicle relative to this recognized component is then determined in the at least one camera image, and the target coordinates are then determined from the determined relative position. The predetermined component can, for example, be carried out by the image processing system by a shape recognition process or through a correlation with an image of the component to be recognized that is stored in the image processing system. The image processing system has the benefit that the user does not himself have to determine or enter the target coordinates.

At least one disclosed embodiment provides that, for a selection of the trailer in a surrounding of the transportation vehicle, at least one camera image of the surroundings is displayed by the display apparatus. The camera image can, for example, be generated by the reversing camera. A user selection of an image region of the at least one camera image is then received. The user can specify the image region, for example, by tapping the at least one camera image on the display apparatus. The image region is then used as the basis for determining the coupling position. This leads to the benefit that, with a plurality of trailers in the surroundings of the transportation vehicle, the control device should be informed of the trailer up to which the transportation vehicle can be maneuvered. As the transportation vehicle then approaches the trailer, the selected image region can be corrected or shifted through a further user choice, for example, a swipe gesture. In this way account is taken of the fact that during the approach the image resolution is improved or enlarged, so that a user can position the image region even more precisely.

The control device, which comprises a computing apparatus that is designed to carry out an exemplary embodiment of the disclosed method, is also comprised. The computing device can, for example, be designed on the basis of a microprocessor or other microcontroller. The method can be realized as a program code for the computing apparatus. The control device can be realized as an infotainment system or a control device of the transportation vehicle, or on the basis of a mobile terminal, for example, a smartphone or a tablet PC.

Disclosed embodiments also comprise a transportation vehicle having an exemplary embodiment of the disclosed control device. The transportation vehicle can, for example, be designed as a passenger car or a commercial transportation vehicle or also as an agricultural device. The driver does not have to be located in the transportation vehicle while he performs the longitudinal control of the transportation vehicle. The driver can also, for example, carry out the longitudinal control of the transportation vehicle by a remote control system. The display apparatus can then, for example, be a mobile operating unit of the transportation vehicle which the driver can take with him out of the transportation vehicle.

In the exemplary embodiment, the described components of disclosed embodiment each represent single features that are to be considered independently of one another, each of which also develops independently of one another, and are thus also to be considered individually, or in a combination other than that illustrated, as elements of the disclosure. The embodiment described can, moreover, also be extended through more of the embodiments already described.

Elements with the same function are each given the same reference signs in the figures.

Figure 1:
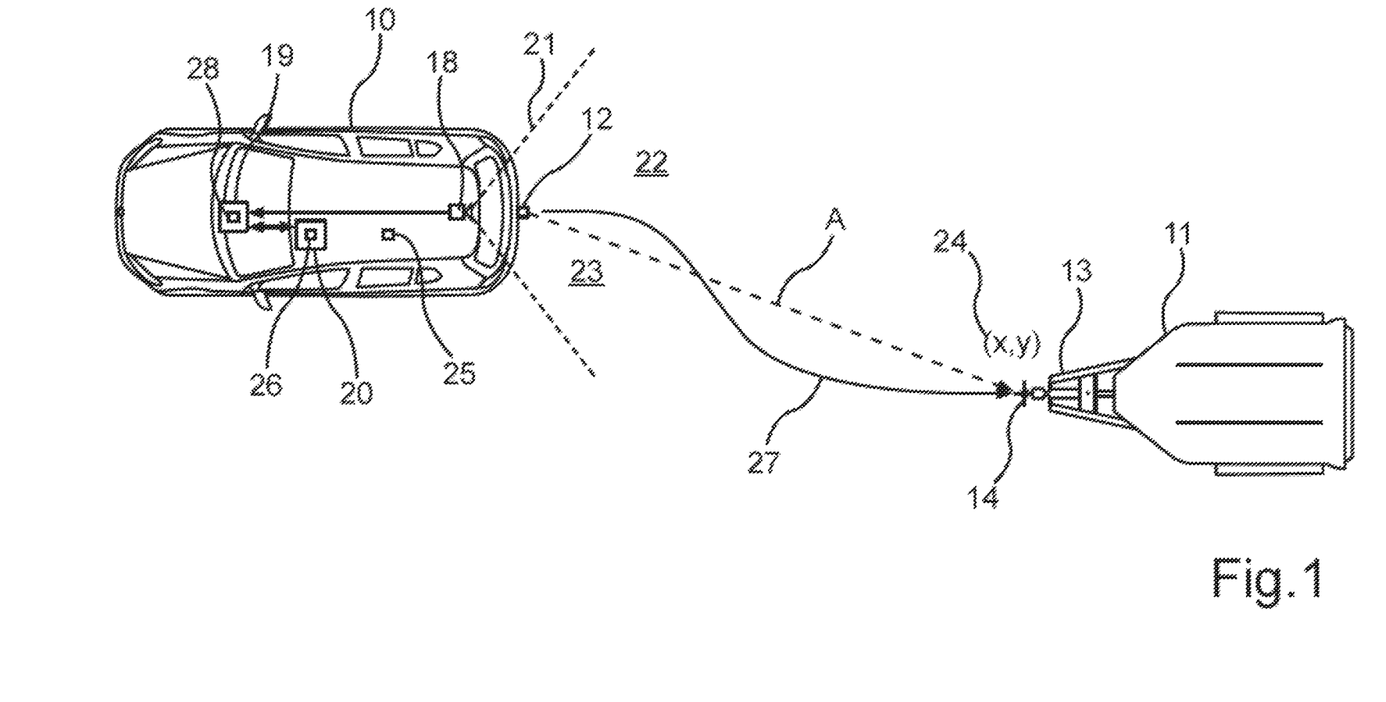
FIG. 1 shows a schematic illustration of an exemplary embodiment of the disclosed transportation vehicle and of the trailer.

FIG. 1 shows a transportation vehicle 10 which can, for example, be an automobile or an agricultural device. FIG. 1 further shows a trailer 11 that can be coupled to the transportation vehicle 10, for which purpose the transportation vehicle 10 can, for example, comprise a trailer coupling 12 to which, for example, a trailer towbar 13 of the trailer 11 can be coupled, so that in total the trailer 11 is joined to the transportation vehicle 10 and can be towed by it.

Figure 2:
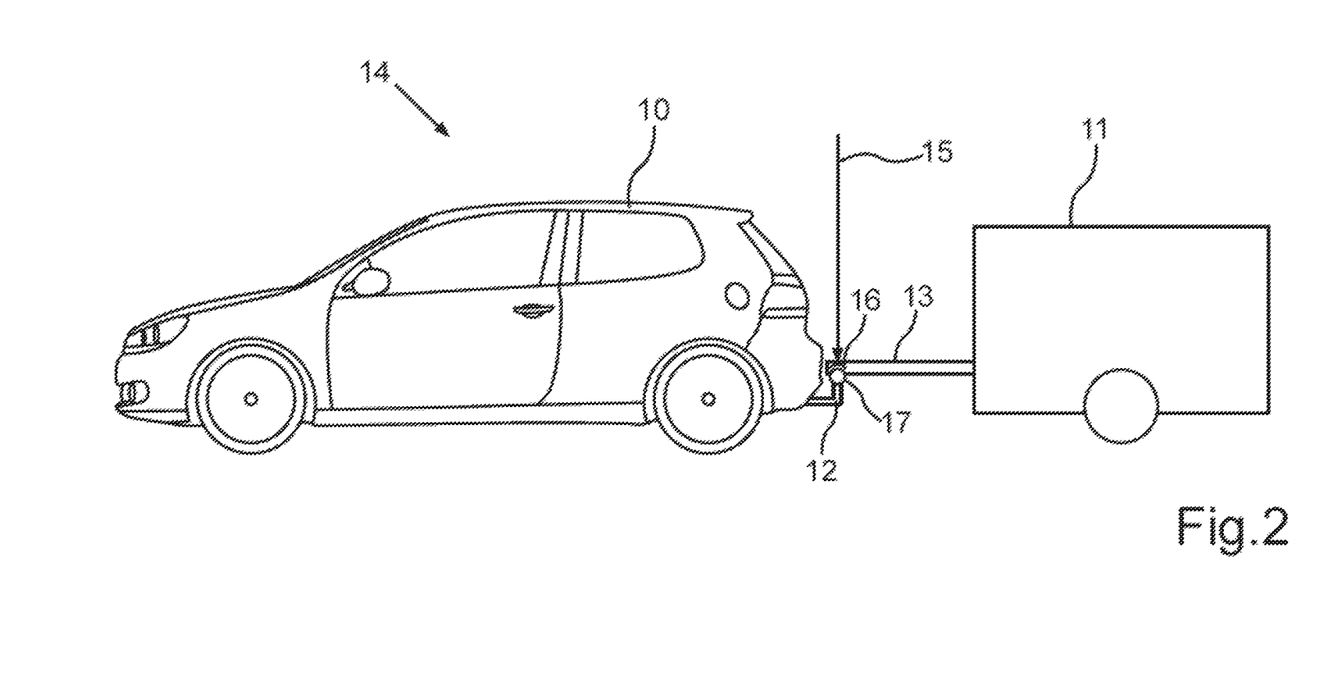
FIG. 2 shows a schematic illustration of the transportation vehicle and of the trailer, wherein the transportation vehicle is located in a coupling position.

So that the trailer 11 does not have to be moved up to the transportation vehicle 10, a driver (not illustrated) of the transportation vehicle 10 can bring or maneuver the transportation vehicle 10 up to the trailer 11 far enough until the transportation vehicle 10 has reached the coupling position 14, which is illustrated more precisely in FIG. 2.

FIG. 2 shows the coupling position 14 in which the transportation vehicle 10 is arranged or positioned relative to the trailer 11 in such a way that the coupling of the trailer 11 to the transportation vehicle 10 can be carried out or completed by lowering 15 the towbar 13 vertically onto the trailer coupling 12. For this purpose, for example, a coupling socket 16 of the trailer towbar 13 can be positioned vertically over a ball head 17 of the trailer coupling 12.

FIG. 1 furthermore illustrates how the driver can be assisted with maneuvering the transportation vehicle 10 in that the transportation vehicle 10 can comprise a camera 18, a control device 19 and a display apparatus 20. The display apparatus 20 can, for example, be a screen of an instrument cluster or of a central console of the transportation vehicle 10. A capture region 21 of the camera 18 can be aligned towards a rear region 23 in a surroundings 22 of the transportation vehicle 10, so that the trailer towbar 13 can be captured or filmed with the capture region 21, while the transportation vehicle 10 approaches the coupling position 14 in reverse. The control device 19 can determine target coordinates 24 of the coupling position 14, for example, on the basis of at least one camera image 25 of the camera 18. The control device 19 can also, for example, receive the target coordinates 24 from out of another control device. The control device 19 can display to the driver by or via the display apparatus 20 a graphical distance display element 26 that informs the driver about a remaining distance A of the transportation vehicle 10 from the coupling position 14. The distance A can be measured as a direct distance (Euclidean distance) or as a path length of a planned approach path 27. A Euclidean distance is assumed below by way of example. It can, for example, be provided that the driver performs the longitudinal control of the transportation vehicle 10, while a control device of the transportation vehicle 10 carries out the transverse control, so that the curve of the approach path 27 is known, and its path length can thus also be determined. To determine the distance A, an image processing system 28 can recognize the towbar 13 in the at least one camera image 25 and thereupon determine the distance A and/or the target coordinates 24.

Figure 3:
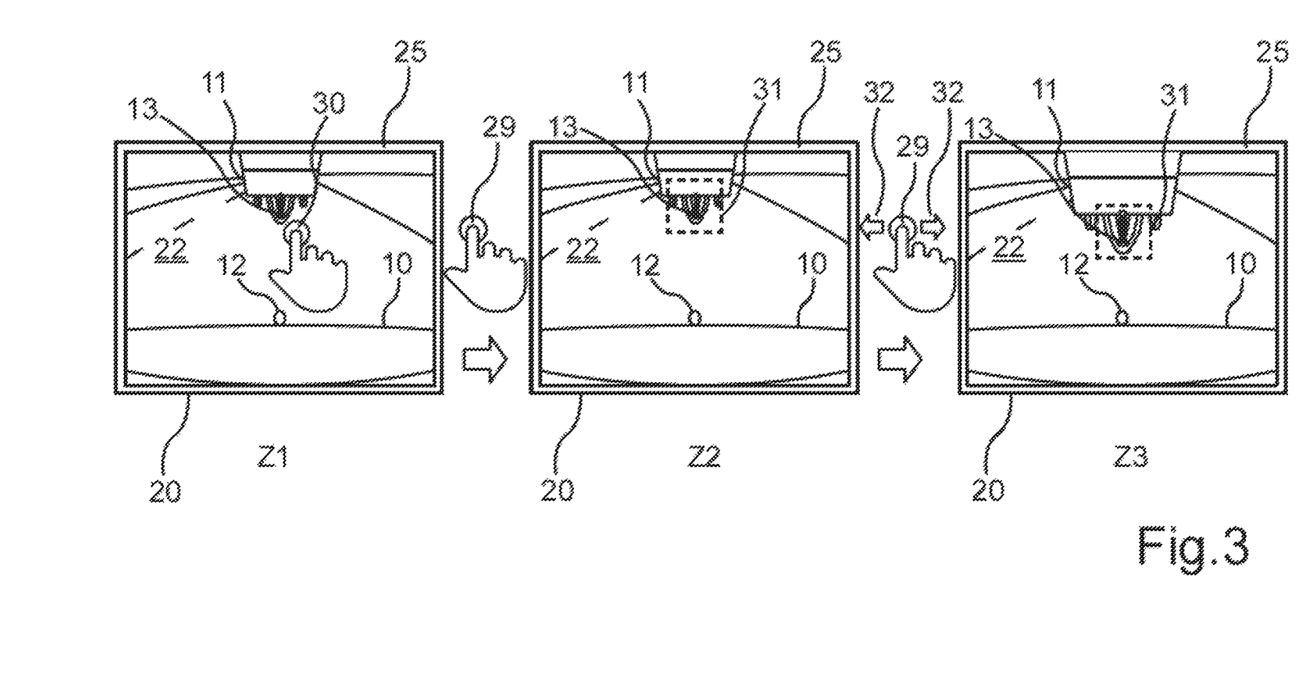
FIG. 3 shows a schematic illustration of a display content of a display apparatus that can be displayed for receiving a user input.

FIG. 3 illustrates how the driver can assist the image processing system 28 in the selection and/or recognition of the trailer towbar 13. The at least one camera image 25 can be shown to the driver by the display apparatus 20. FIG. 3 illustrates three different display states Z1, Z2, Z3 of the display apparatus 20, with three different camera images 25 which differ from one another in that the trailer 11 has a different distance A from the transportation vehicle 10. At a greater distance (display state Z1) the driver can, for example, mark or select an image region 30 on the display apparatus 20 with a finger 29, which indicates to the image processing system 28 that the target coordinates 24 of the region of the surroundings 22 selected in the image region 30 should be taken as a basis. After this, when the transportation vehicle 10 makes a movement, an automatic tracking 31 can be performed on the selected image region 30 in the respectively current camera image 25 (display state Z2). The user can then, for example, make corrections 32 to the position of the image region, for example, with the finger 29 again, when the transportation vehicle 10 has approached the trailer towbar 13, and the trailer towbar 13 is thus more accurately recognizable in the camera image 25. The corrected tracking 31 can then be continued (display state Z3).

Figure 4:
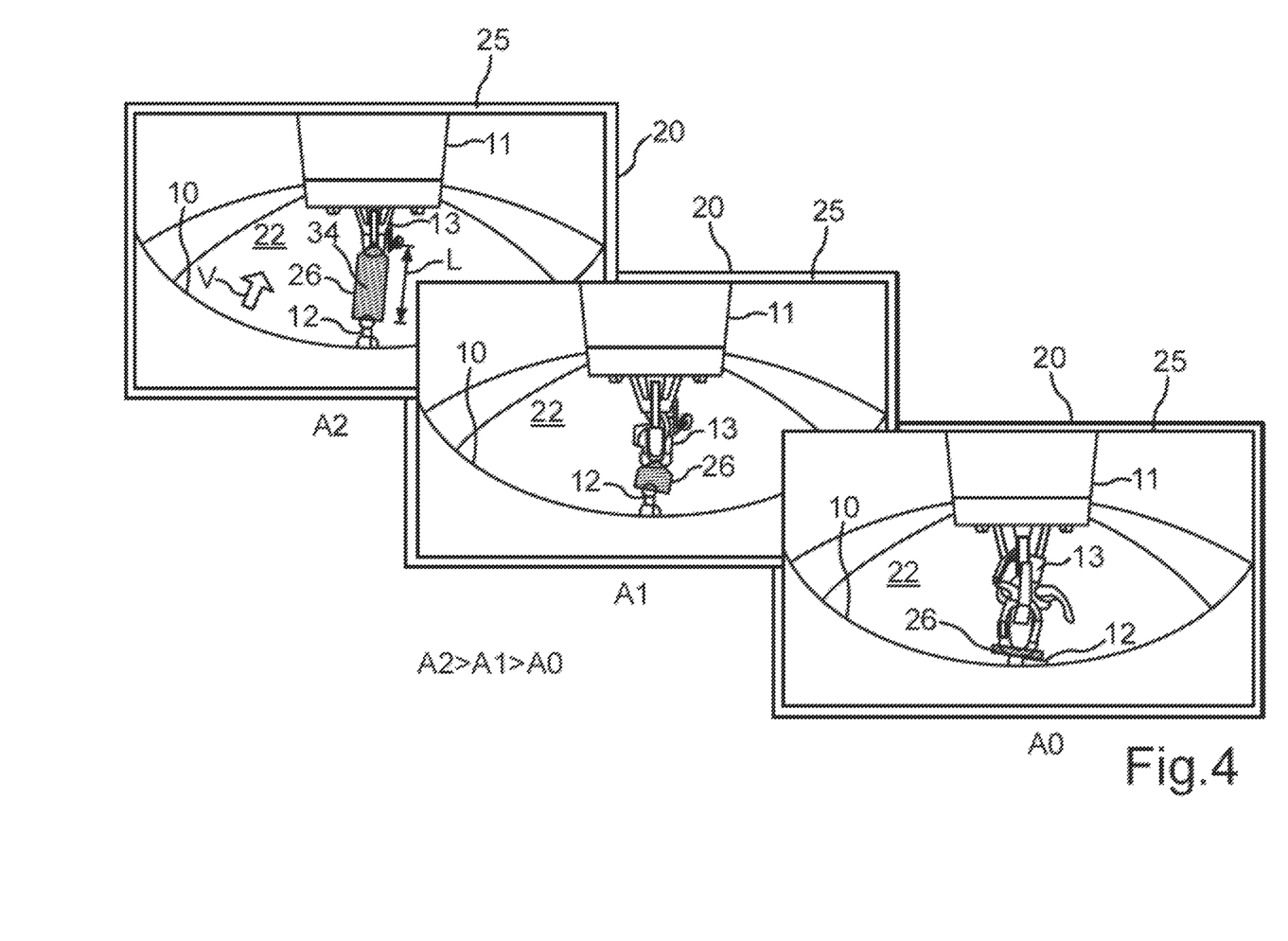
FIG. 4 shows a schematic illustration of a display content of a display apparatus that can be displayed during an approach of the transportation vehicle to the coupling position.

FIG. 4 illustrates how the remaining distance A can be shown to the driver, for example, by overlaying the distance display element 26 in the currently displayed camera image 25, for different distance values A0, A1, A2 of the distance A. It is assumed here that the following relation between the distance values applies: A2>A1>A0, where A0 represents reaching the coupling position 14 (A0=0 m). The distance display element 26 can, for example, be realized as an arrow, a so-called swelling arrow. A length 33 of the distance display element 26 here represents a size parameter of the distance display element 26 which can be adjusted or is set by the control device 19. A color 34 (represented in FIG. 4 by hatching) can indicate a test result related to the driving speed V and symbolize whether the speed of travel V is appropriate, is too large, or, if it is retained, will become too large within a predetermined period of time.

Figure 5:
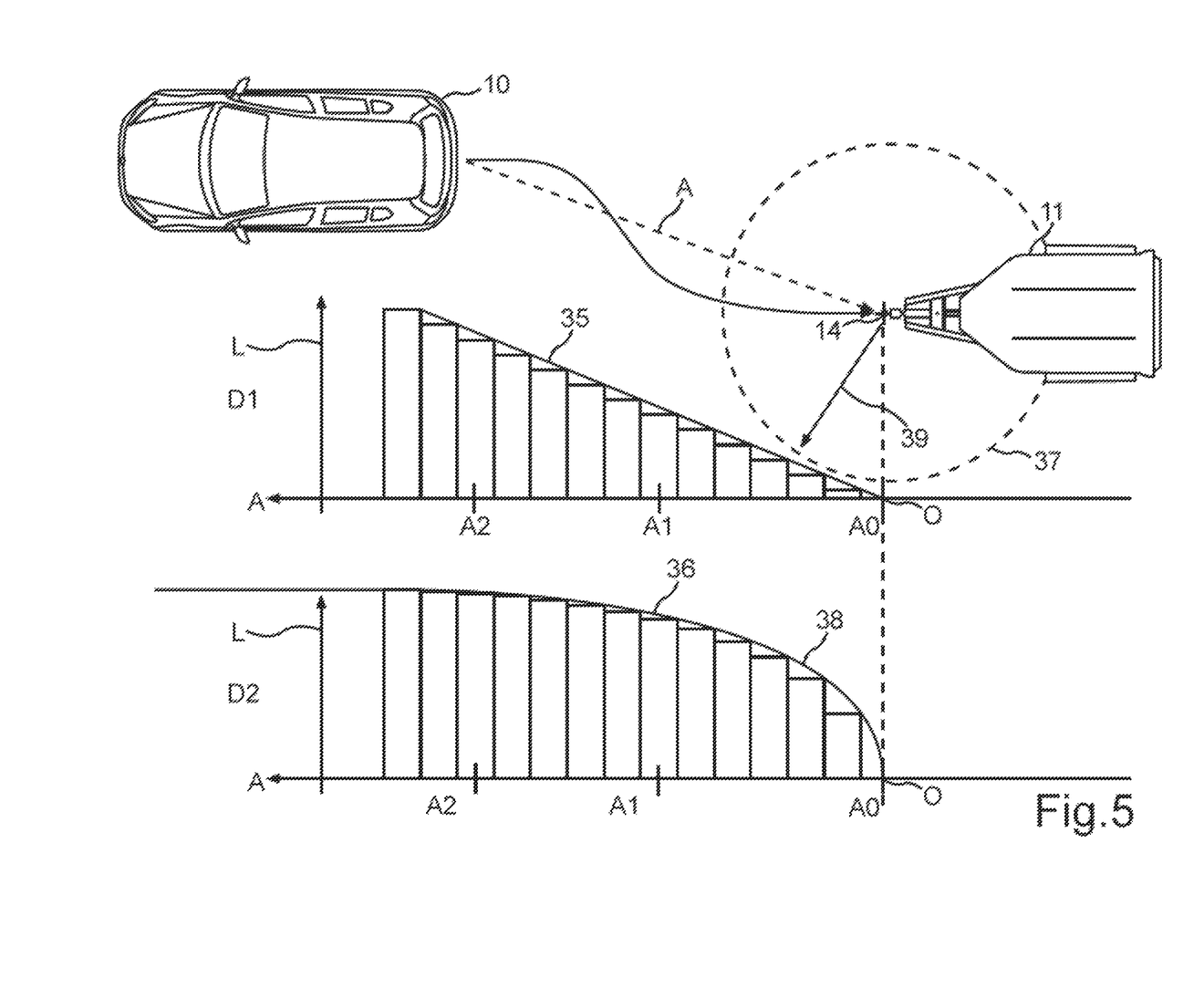
FIG. 5 shows a diagram with a non-linear scaling function for adjusting a size parameter of a graphical distance display element of the display content of FIG. 4.

FIG. 5 shows how the length 33 can be set as a size parameter depending on the distance value A0, A1, A2 of the distance A. FIG. 5 here illustrates the driving situation according to FIG. 1 again. The case of the prior art is illustrated in a first diagram D1, in which, through a linear scaling function 35, the length 33 continuously becomes smaller, in proportion to the distance value of the distance A. A diagram D2 illustrates in contrast how, in the control device 19, a non-linear scaling function 36 represents or converts the distance value of the distance A into the length L in a non-linear manner, so that, in particular, in a near region 37 around the coupling position 14, a greater position resolution results than outside the near region 37. The concrete distance values A0, A1, A2 are illustrated in the diagrams by way of example. With the continuously differentiable curve 38 shown in FIG. 5, the position resolution increases continuously. It can be provided that a near region 37 results with a radius 39 that lies in the range between 20 centimeters up to 2 meters.

Figure 6:
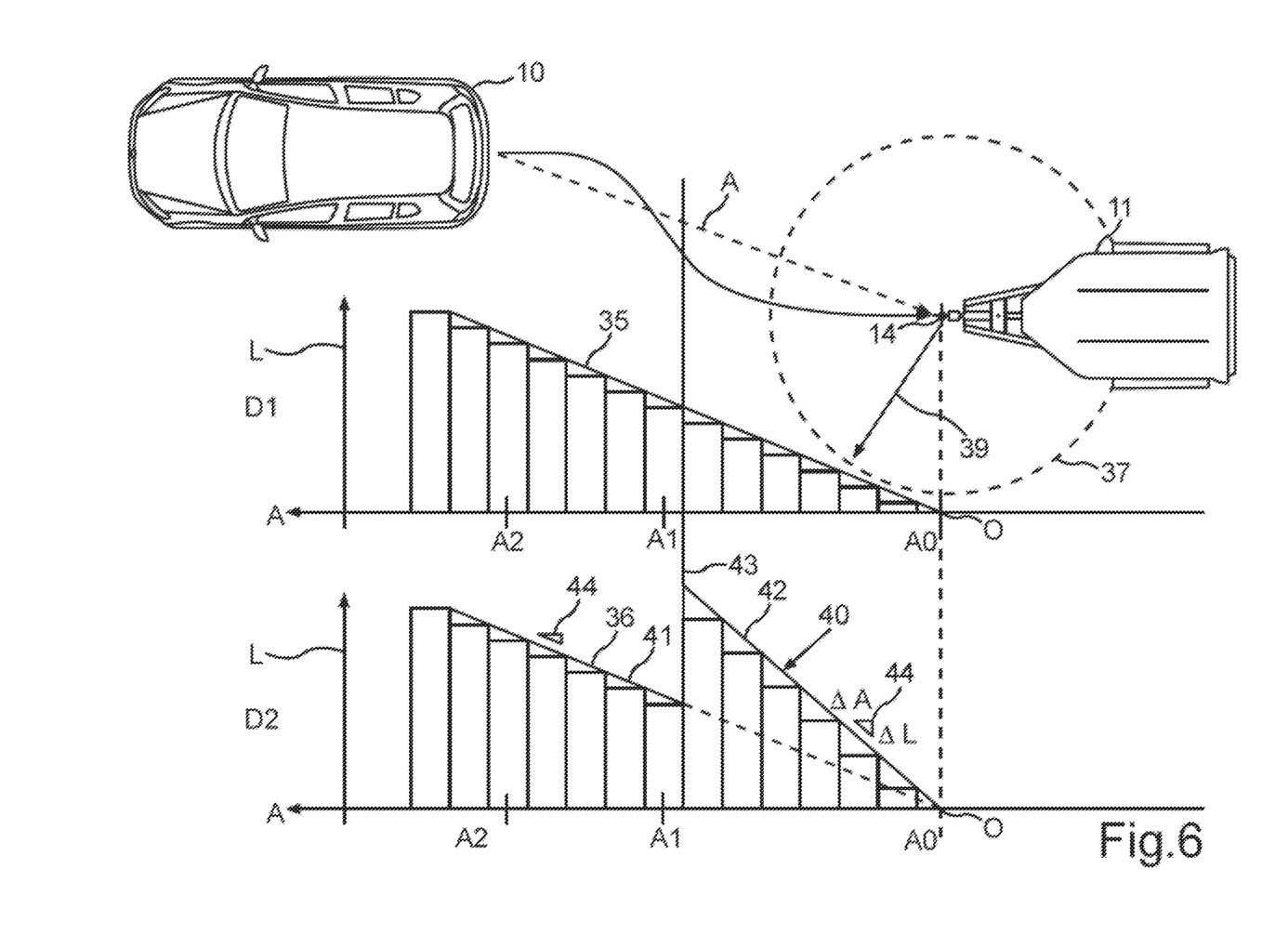
FIG. 6 shows a diagram with a further non-linear scaling function for the distance display element of FIG. 4.

In contrast to this, in a diagram D2 FIG. 6 shows a non-linear scaling function 36 that is designed as a two-stage scaling function 40, so that two stages 41, 42 of position resolution result. Diagram D1 corresponds to diagram D1 of FIG. 5. On reaching the boundary of the near region 37, which in this case is discrete, a switch is made from the first stage 41 to the second stage 42, so that a jump 43 results in the scaling of the distance display element 26. The position resolution can generally, for example, be a local gradient or a local slope 44 of the scaling function 36. Between the two stages 41, 42, the magnitude of the gradient 44 is thus increased. The gradient 44 can, for example, be defined as the quotient $\Delta L/\Delta A$, that is to say a ratio of a change $\Delta L$ of the size parameter L for a predetermined change $\Delta A$ of the distance A, wherein $\Delta A$ can lie in a range between 10 cm up to 1 m. The calculation can also be performed relatively, for example, as a percentage change.

Figure 7:
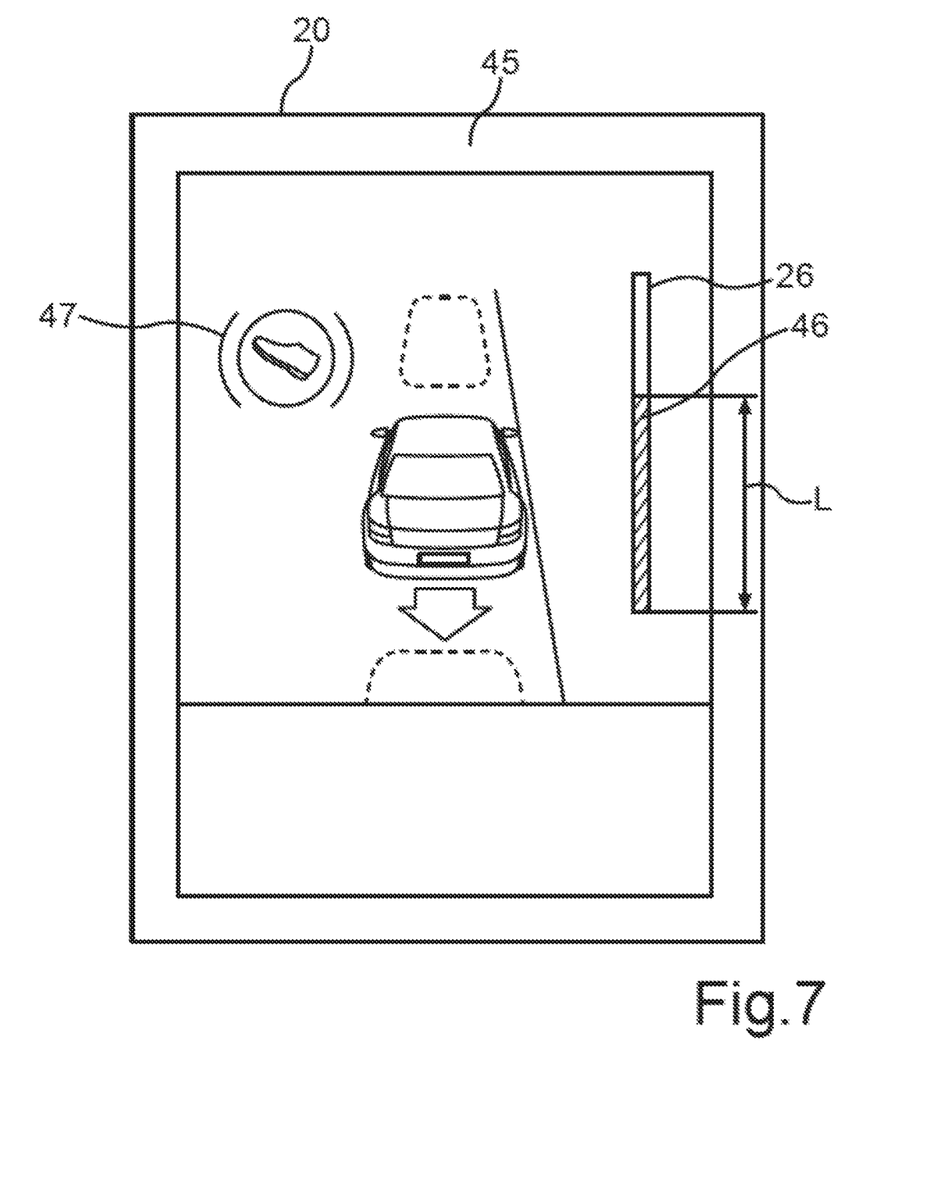
FIG. 7 shows a schematic illustration of an alternative distance display element.

FIG. 7 illustrates an alternative display content 45 for the display apparatus 20, in which a camera image 25 is not necessary. The distance display element 26 can be designed as a bar graph 46, whose length L represents the size parameter that is set by the control device 19 depending on the distance A. A non-linear scaling function 36 can here again be used as a basis for converting the current distance value into the value of the length L.

A further graphical element 47 whose display color can be changed can also be provided if the driving speed V of the transportation vehicle 10 lies above the described threshold value.

FIG. 8 again illustrates the described operations of the method that can be carried out with the control device 19.

Figure 8:
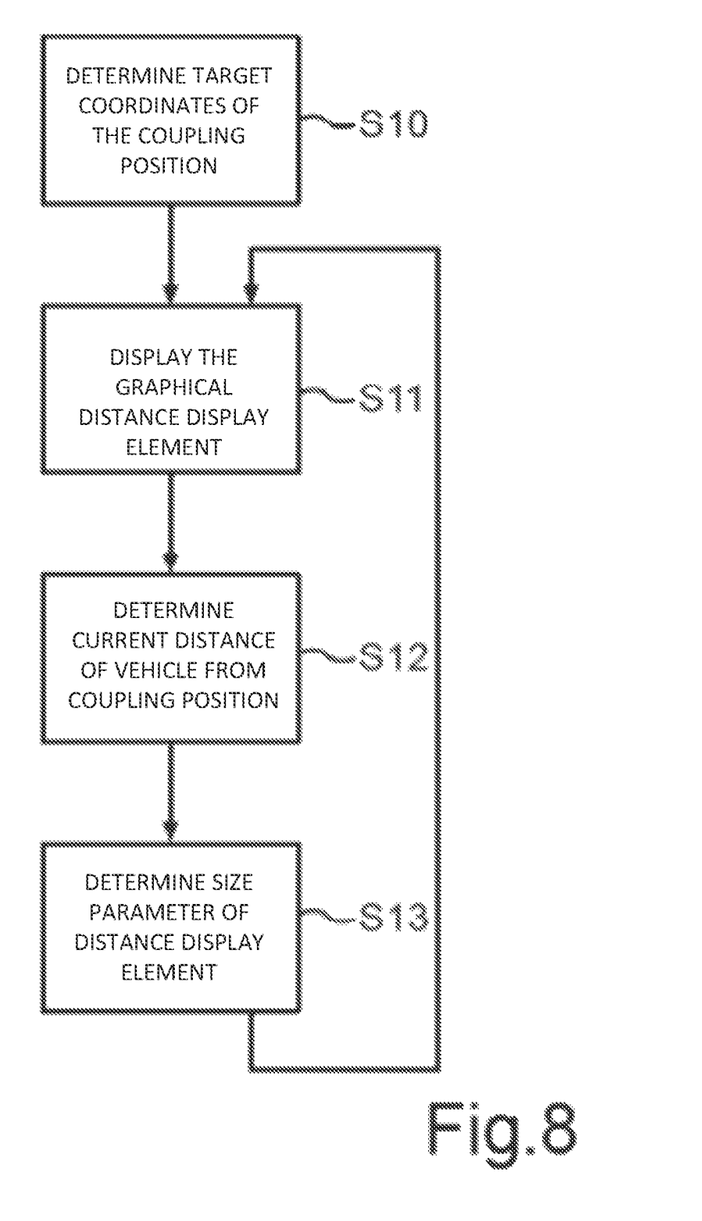
FIG. 8 shows a flow diagram of an exemplary embodiment of the disclosed method.

The target coordinates 24 of the coupling position 14 can be determined by the control device 19 in an operation at S10, i.e., for example, be received or calculated by itself. The graphical distance display element 26 can be displayed to the driver in an operation at S11 by the display apparatus 20. The current distance value of the distance A of the transportation vehicle 10 from the coupling position 14 can be determined in an operation at S12. The value that the size parameter of the distance display element 26, for example, its length L, should have can be determined in an operation at S13 by the non-linear scaling function 36 for the distance value of the distance A that has been determined. Thereupon the distance display element 26 can be displayed again in an operation at S11 with the updated value of the size parameter, for example, the length L, and the method can continue again with the operation at S12.

The trailer coupling assistant (AAA) formed in this way helps, in that the towbar is recognized automatically by image processing, and a distance to the towbar is illustrated graphically.

For the case in which the driver is still too far away from the trailer, the AAA would initially reverse in a straight line until the image processing system has detected the trailer. The driver can, however, help the system in that he marks the trailer (see FIG. 3).

Informing the driver of how far he must still move is an important aspect. A manual determination in the camera image is difficult: If the trailer towbar is located in the ideal coupling position (the towbar is directly above the trailer coupling ball), then this may, however, not be detectable, depending on the position of the crank of the trailer. This means that the driver would then, for example, move too far.

The solution is that the system automatically determines the remaining movement distance (detection of the target position in the camera image, transformation of the image coordinates into the physical coordinates) and informs the driver through the control device (HMI—Human Machine Interface). Two facets can be implemented here:

a) swelling arrow or bar graph in the instrument cluster (FIG. 7)
b) swelling arrow as overlay (superimposition) in the camera image (FIG. 4)

Altogether the example shows how a control device for assisting the driver when coupling a transportation vehicle to a trailer can be made available.

LIST OF REFERENCE SIGNS

10 Transportation vehicle
11 Trailer
12 Trailer coupling
13 Trailer towbar
14 Coupling position
15 Vertical movement
16 Trailer coupling socket
17 Coupling head
18 Camera
19 Control device
20 Display apparatus
21 Capture region
22 Surroundings
23 Rear region
24 Target coordinates
25 Camera image
26 Distance display element
27 Approach path
28 Image processing system
29 Finger
30 Image region
31 Tracking
32 Shift movement
33 Length
34 Color
35 Linear scaling function
36 Non-linear scaling function
37 Near region
38 Curve
39 Radius
40 Switchover function
41 Stage
42 Stage
43 Jump
44 Local gradient
45 Display content
46 Bar graph
47 Further display element
A Distance
A0, A1, A2 Distance value
D1, D2 Diagram S10-S13 Method operation
Z1-Z3 Display state

The invention claimed is:

1. A control device with a computing apparatus configured to assist a driver maneuvering a transportation vehicle relative to a trailer to couple the transportation vehicle to the trailer,
wherein target coordinates of a coupling position provided for the transportation vehicle for coupling are determined and repeated by the control device while a graphical distance display element is displayed to the driver by a display apparatus of the transportation vehicle, a current distance value of a distance of the transportation vehicle from the coupling position is determined, and a predetermined size parameter of the graphical distance display element is adjusted based on the current distance value,
wherein a non-linear scaling function is used for a conversion from the determined current distance value into a value of the size parameter that is to be set, and
wherein the non-linear scaling function used at least in a predetermined region around the coupling position provides a position resolution that is higher than the position resolution provided outside the region around the coupling position.

2. A transportation vehicle comprising:
a control device with a computing apparatus, wherein the control device assist assists a driver maneuvering the transportation vehicle relative to a trailer to couple the transportation vehicle to the trailer,
wherein target coordinates of a coupling position provided for the transportation vehicle for coupling are determined and repeated by the control device while a graphical distance display element is displayed to the driver by a display apparatus of the transportation vehicle, a current distance value of a distance of the transportation vehicle from the coupling position is determined, and a predetermined size parameter of the graphical distance display element is adjusted based on the current distance value,
wherein a non-linear scaling function is used for a conversion from the determined current distance value into a value of the size parameter that is to be set, and
wherein the non-linear scaling function used at least in a predetermined region around the coupling position provides a position resolution that is higher than the position resolution provided outside the region around the coupling position.

3. A method for operating a control device for a transportation vehicle to assist a driver maneuvering the transportation vehicle relative to a trailer to couple the transportation vehicle to the trailer, wherein target coordinates of a coupling position provided for the transportation vehicle for coupling are determined and repeated by the control device while a graphical distance display element is displayed to the driver by a display apparatus of the transportation vehicle, a current distance value of a distance of the transportation vehicle from the coupling position is determined, and a predetermined size parameter of the graphical distance display element is adjusted based on the current distance value,
wherein a non-linear scaling function is used for a conversion from the determined current distance value into a value of the size parameter that is to be set, and
wherein the non-linear scaling function used at least in a predetermined region around the coupling position provides a position resolution that is higher than the position resolution provided outside the region around the coupling position.

4. The method of claim 3, wherein the position resolution is based on a quotient of a change of the size parameter to a predetermined change of the distance.

5. The method of claim 3, wherein the non-linear scaling function is a continuously differentiable curve or a two-stage or multi-stage switchover function.

6. The method of claim 3, wherein the graphical distance display element is a bar graph or an arrow a length of the graphical distance display element being adjusted as the size parameter.

7. The method of claim 3, wherein the graphical distance display element is displayed while the driver carries out at least longitudinal control of the transportation vehicle.

8. The method of claim 3, further comprising:
determining an absolute travel speed and/or a relative travel speed with respect to the coupling position,
determining a test result indicating whether a driving speed is larger than a predetermined threshold value, and
setting an output parameter, different from the size parameter of the graphical distance display element and/or a further graphical element displayed on the display apparatus and/or an acoustic output based on the test result.

9. The method of claim 8, wherein the predetermined threshold value is set depending on the determined current distance value.

10. The method of claim 8, further comprising determining, as a further test result, whether the travel speed will, prospectively, be larger than the threshold value in a predetermined period of time based on the determined travel speed and the determined current distance value, and setting the output parameter based on the further test result.

11. The method of claim 3, wherein the coupling position is a position of the transportation vehicle relative to the trailer, wherein at the coupling position, a coupling mechanism of a trailer towbar of the trailer is arranged vertically above a trailer coupling of the transportation vehicle.

12. The method of claim 3, further comprising determining the target coordinates by an image processing system which, once or repeatedly, receives at least one camera image from at least one camera, wherein a predetermined component of the trailer is recognized in the at least one camera image, a position of the transportation vehicle relative to the predetermined component is determined, and the target coordinates are determined based on the determined relative position.

13. The method of claim 3, wherein at least one camera image of the surroundings is displayed by the display apparatus for a selection of the trailer in the surroundings of the transportation vehicle, a user selection of an image region of the at least one camera image is received, and the selected image region is used as a basis for the determination of the coupling position.

* * * * *